J. B. EATON.
Lozenge-Machine.
No. 227,505.  Patented May 11, 1880.
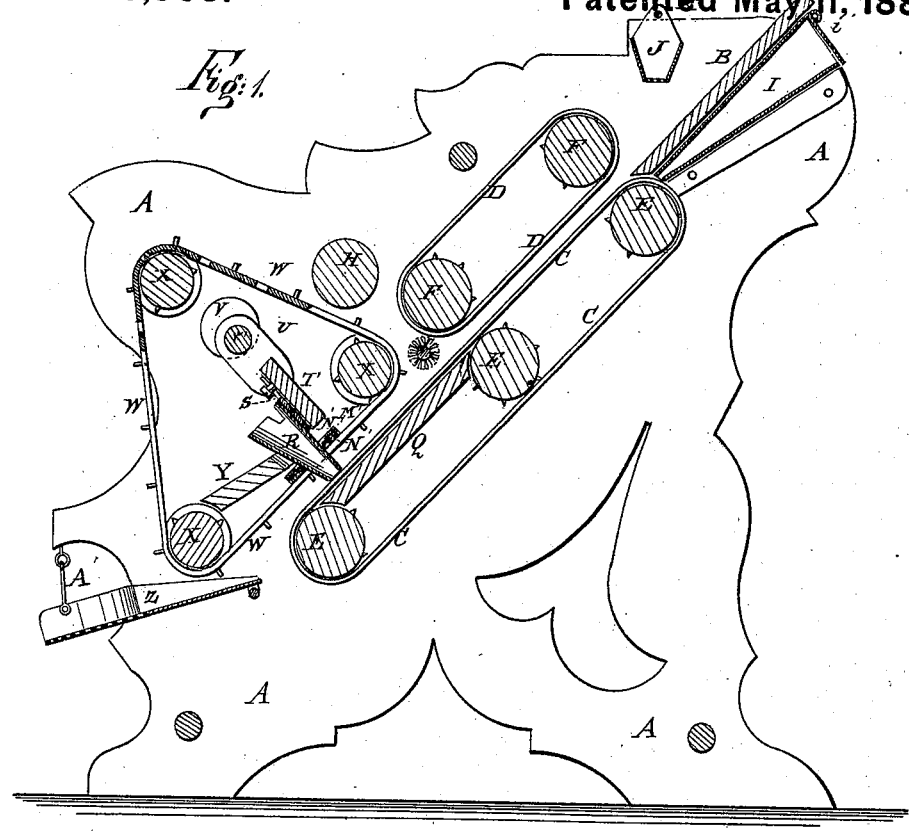
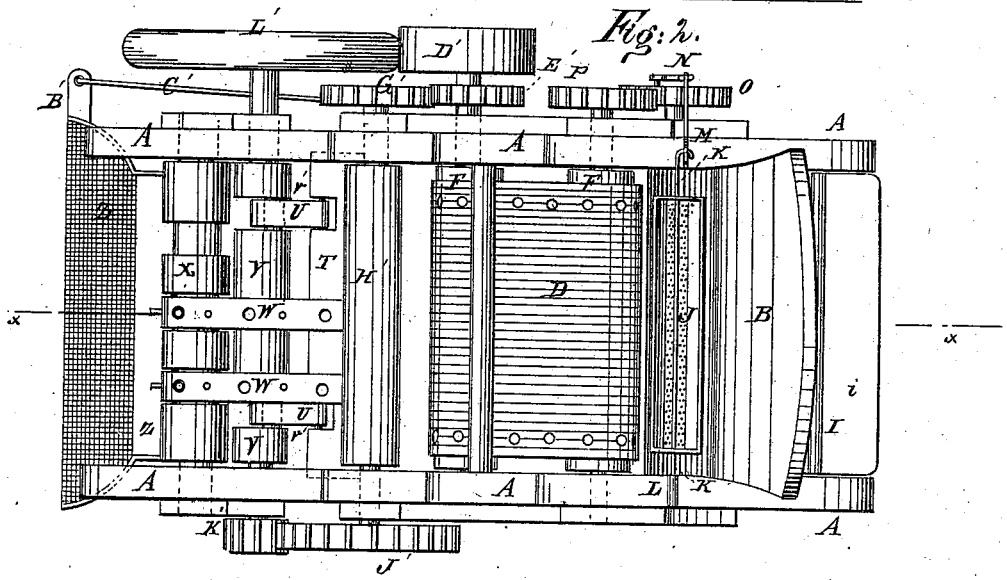
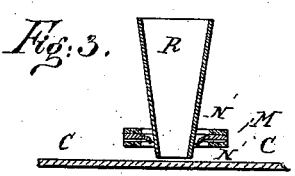
WITNESSES:
INVENTOR:
J. B. Eaton
BY Munn & Co.
ATTORNEYS.

2 Sheets—Sheet 2.

J. B. EATON.
Lozenge-Machine.

No. 227,505. Patented May 11, 1880.

WITNESSES:
Chas. Nida.
C. Sedgwick

INVENTOR:
J. B. Eaton
BY Munn & Co.
ATTORNEYS.

UNITED STATES PATENT OFFICE.

JOSEPH B. EATON, OF SHAMOKIN, PENNSYLVANIA.

LOZENGE-MACHINE.

SPECIFICATION forming part of Letters Patent No. 227,505, dated May 11, 1880.

Application filed September 6, 1879.

*To all whom it may concern:*

Be it known that I, JOSEPH B. EATON, of the city of Shamokin, in the county of Northumberland and State of Pennsylvania, have invented a new and useful Improvement in Lozenge-Machines, of which the following is a specification.

Figure 4:
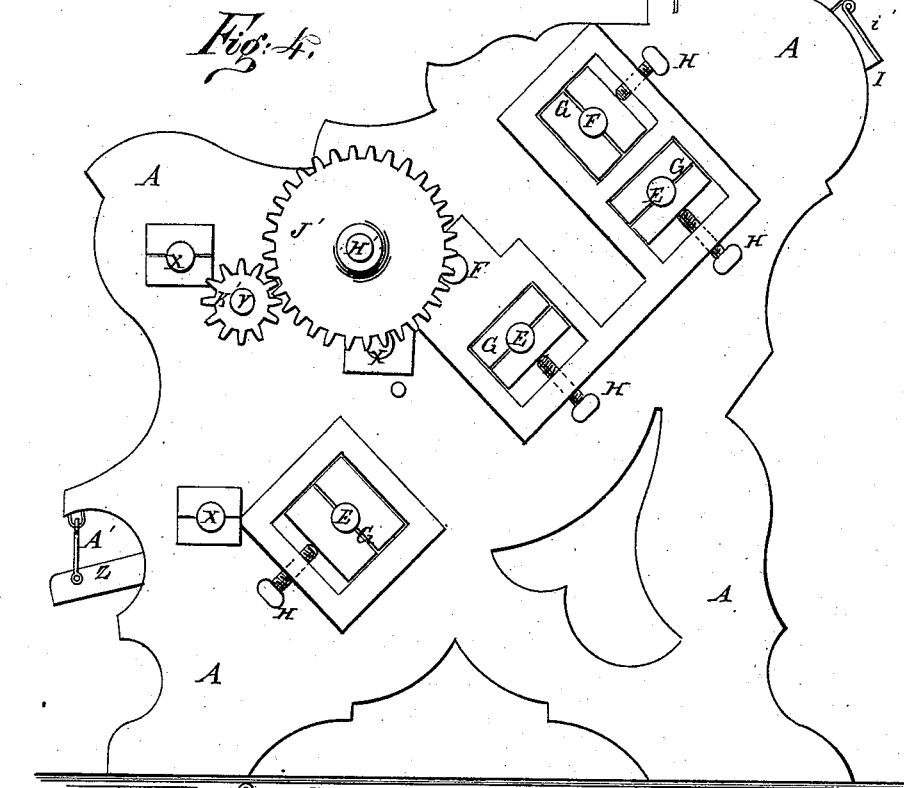
Figure 5:
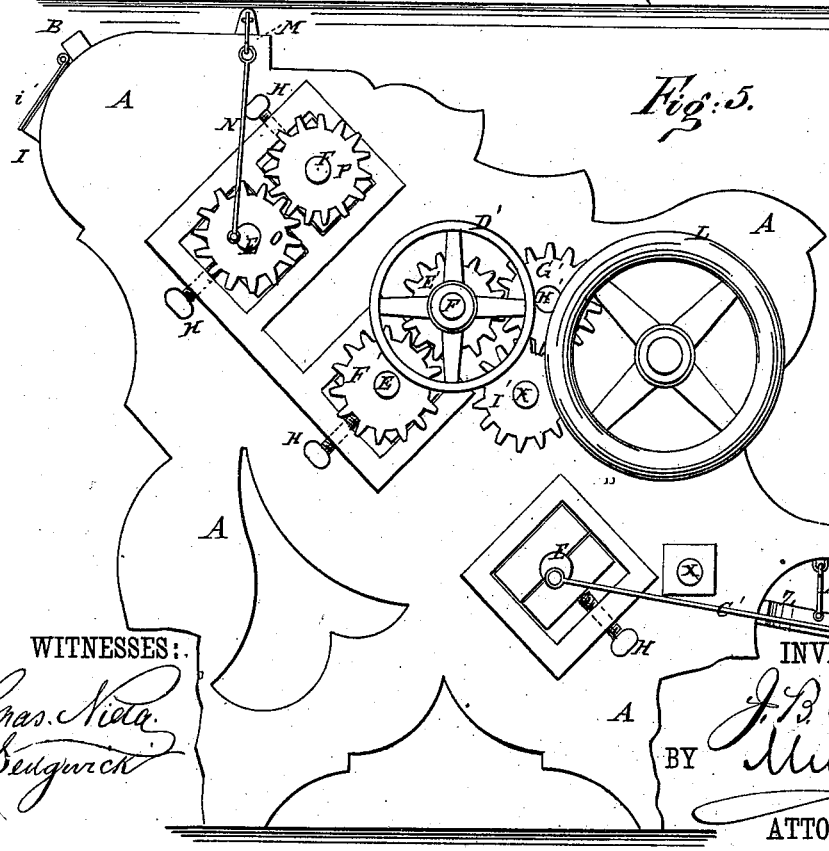

Figure 1, Sheet 1, is a vertical longitudinal section of my improved machine, taken through the line $x\ x$, Fig. 2. Fig. 2, Sheet 1, is a top view of the same. Fig. 3, Sheet 1, is a detail section of one of the cutters and its cleaner. Fig. 4, Sheet 2, is a side view of the machine. Fig. 5, Sheet 2, is a view of the reverse side of the machine.

Similar letters of reference indicate corresponding parts.

The object of this invention is to furnish an improved machine for making lozenges which shall be simple in construction, convenient in use, and reliable and effective in operation.

The invention consists in arranging narrow belts between the cutters so as to allow the lozenges to pass through, while they hold the scrap down and feed it forward, and in connecting a polisher with the top of hollow cutters by a guide that transfers the lozenges over the roller, between the belts, and on the polisher, as hereinafter described.

A represents the frame-work of the machine, to the upper rear part of which is secured the feed apron or hopper B, for feeding the paste to the machine. From the apron or hopper B the paste passes to and between the two endless rubber belts or aprons C D, where it is spread into a sheet, and by which it is carried down to the cutters. The lower belt, C, is made the longer, passes around three rollers, E, and has holes formed through it near its edges to receive spurs attached to the said rollers E, to prevent the said belt from slipping. The upper and shorter belt, D, passes around two rollers, F, and has holes formed through it near its edges to receive spurs attached to the said rollers F, to prevent the said belt from slipping.

The journals of all the rollers E F revolve in sliding bearings G, which are provided with hand-screws H, so that the said rollers may be adjusted to tighten and slacken the said belts and to bring them nearer to and farther from each other by turning the said hand-screws.

I J are two hoppers or boxes to receive starch and sprinkle it upon the belts C D, to prevent the paste from sticking to them. The lower starch box, I, is placed beneath the feed apron or hopper B, with the narrow opening in its lower end close to the belt C as it passes over the upper part of the upper roller, E, and rests upon cleats attached to the frame A.

The starch-box I is provided with a hinged cover, $i'$, to prevent anything from falling into it accidentally. The upper starch-box, J, is provided with a perforated bottom, and is suspended from a rod, K, that crosses the upper rear part of the frame A. One end of the rod K slides in an eye, L, attached to the frame A, and its other end is pivoted to the upper arm of a bent lever, M, which is pivoted at its angle in a slot in the frame A. The other arm of the bent lever M projects, and to it is pivoted the upper end of a connecting-rod, N, the lower end of which is pivoted to the gear-wheel O, attached to the journal of the upper roller E, so that the starch-box J will be agitated to shake out the starch by the movement of the machine. The starch-box J is suspended in such a position as to sprinkle the starch upon the paste as it passes in between the two belts C D.

The teeth of the gear-wheel O mesh into the teeth of an equal gear-wheel, P, attached to the journal of the upper roller F, so that the two belts will move at exactly the same velocity. To the frame A, between the two lower rollers E, is attached a board, Q, in such a position that the upper part of the belt C may move across its upper surface, so that it may serve as a table to support the said upper part of the belt against the action of the cutters R. The cutters R are made hollow and tapering, their lower or cutting ends being the smaller, so that the lozenges will not be liable to clog the said cutters. The cutters R are attached to a plate, S, which is slotted transversely to receive the screws or bolts by which it is secured to the cross-bar T, to allow the cutters R to be adjusted as may be required.

The ends of the cross-bar T move up and down in guide-grooves in the frame A, and to its upper edge are hinged the lower ends of two connecting-bars, U, the upper ends of which are connected with eccentrics or cranks $v'$, formed upon or attached to the shaft V. The journals of the shaft V revolve in bearings in the frame A.

The starch is removed from the upper belt, D, as it passes around the lower roller F, by a brush pivoted to the frame A at the lower side of the said lower roller F. The sheet of paste, after passing from the upper belt or apron, D, is held down upon the lower belt or apron, C, and is kept from being raised by the cutters R by the series of narrow belts, W, which pass between the cutters R, and are provided with spikes or prongs to carry the scrap forward, the said scrap dropping from the lower end of the belt C into a receiver. The belts W pass around three rollers, X, and have holes formed through them to receive spurs attached to the said rollers to prevent the said belts from slipping. The journals of the rollers X revolve in bearings in the frame A. As the lozenges rise above the upper ends of the cutters R they fall upon the inclined apron Y, down which they slide to the metallic apron Z. The inner edge of the apron Z is hung upon a rod or other support attached to the frame A. The outer part of the apron Z is supported by two rods, A', the lower ends of which are pivoted to the side flanges of the said apron, and their upper ends are pivoted to the frame A.

To an arm, B', attached to an outer corner of the apron Z, is pivoted the outer end of a connecting-rod, C', the inner end of which is pivoted to a crank-pin attached eccentrically to the journal of the lowest roller E, so that the said apron may be oscillated by the movement of the machine. The outer part of the apron Z is perforated with numerous small holes to allow the starch to shake through, while at the same time the surface of the lozenges will be polished by their movement upon the said oscillating apron Z.

To the journal of the lower roller F is attached a pulley, D', to receive the driving-belt and a gear-wheel, E', the teeth of which mesh into the equal gear-wheel F', attached to the middle roller E, so that the two belts C D may be driven together and at the same velocity.

The teeth of the gear-wheel E' also mesh into the teeth of the gear-wheel G', attached to the journal of the shaft H'. The teeth of the gear-wheel G' mesh into the teeth of the gear-wheel I', attached to the journal of the inner roller, X, that drives the belts W, so that the said belts may be driven at exactly the same velocity as the belts C D. The shaft H' revolves in bearings in the frame A, and to its other journal is attached a large gear-wheel, J', the teeth of which mesh into a smaller gear-wheel, K', attached to the journal of the crank or eccentric shaft V, that operates the cutters R. To the other journal of the crank or eccentric shaft V is attached a fly-wheel, L', to give steadiness of motion to the operating parts of the machine. The tapering cutters R work up and down through holes in a gum plate, M', so that as the said cutters are drawn upward the said plate M' may wipe off any paste that may adhere to them, and thus keep them clean. The gum plate M' is inserted between two metal or wood plates, N', the ends of which are attached to the frame A, and which have holes formed through them for the passage of the cutters R, the said holes being made considerably larger than the holes through the gum plate M', so that the said gum plate can contract and expand as the cutters R move up and down through it to cause it to always fit upon the said cutters and keep them wiped off clean.

Having thus fully described my invention, I claim as new and desire to secure by Letters Patent—

1. The combination, in a lozenge-machine, of the belt C, cutters R, and narrow belts W, the latter arranged between the cutters, as shown and described.

2. The combination of the cutters R, guide-board Y, lower roll, X, and perforated vibrating plate Z, as and for the purpose set forth.

JOSEPH BIRD EATON.

Witnesses:
 JAMES A. SHIPP,
 A. C. KRAMLICH.